No. 866,667. PATENTED SEPT. 24, 1907.
E. MATTMAN.
MEANS FOR FASTENING COLLECTOR LEADS.
APPLICATION FILED JAN. 31, 1907.
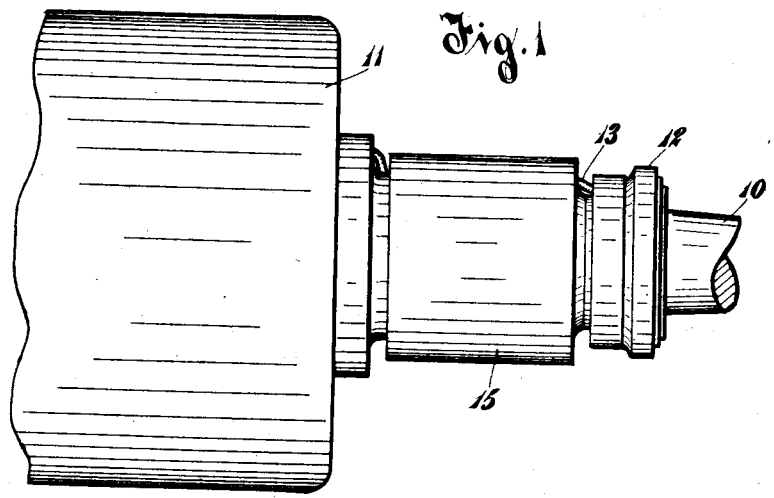
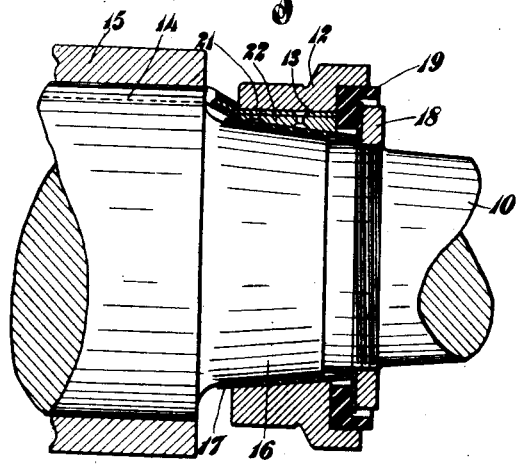
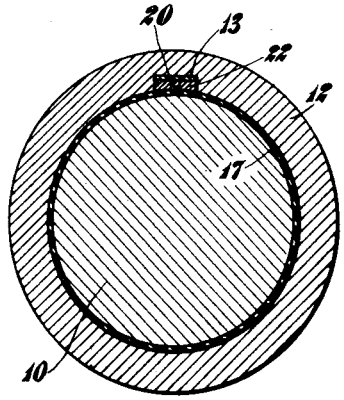
Witnesses
Inventor
Emil Mattman
By
Chas. E. Lord
Attorney

UNITED STATES PATENT OFFICE.

EMIL MATTMAN, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MEANS FOR FASTENING COLLECTOR-LEADS.

No. 866,667.  Specification of Letters Patent.  Patented Sept. 24, 1907.

Application filed January 31, 1907. Serial No. 355,017.

*To all whom it may concern:*

Be it known that I, EMIL MATTMAN, a citizen of the Republic of Switzerland, residing at Norwood, in the county of Hamilton and State of Ohio, have invented certain new and useful Improvements in Means for Fastening Collector-Leads, of which the following is a full, clear, and exact specification.

My invention relates to dynamo-electric machines and particularly to the connections between the collector leads and collector rings of high speed rotary members.

In dynamo-electric machines having rotary windings connected to collector rings or slip rings, it is common practice, particularly in turbo-alternators and other rotating field alternators to connect the collector leads to the collector rings by fastening the ends of the leads to axial bolts extending laterally from the sides of the rings. This construction is satisfactory for nearly all machines except those driven at exceedingly high speeds, such as the speed at which 60 cycle two pole turbo-alternators are driven. In machines adapted to be driven at very high speeds it is necessary to provide collector rings of small diameter. Consequently if holes are drilled into the sides of these rings for the axial bolts, not only would the rings be very much weakened, but also their wearing depth would be reduced. Furthermore, there would be danger of the bolts being bent outward by centrifugal force and the connections between the bolts and leads destroyed.

The object of my invention is to provide improved means for effecting good mechanical and electrical connection between the collector leads and collector rings of rotary members of dynamo-electric machines adapted to be driven at high speeds of rotation.

A further object is to provide a connection for the leads, which will be simple and inexpensive and permit the rings to be removed without bending or injuring the leads.

With this end in view, my invention consists in certain novel details of construction, and combinations and arrangements of parts described in the specification and set forth in the appended claims.

For a better understanding of my invention, reference is had to the accompanying drawings in which Figure 1 is an elevation of a rotary member in this case the rotary field member of a high speed turbo-alternator equipped with my invention. Fig. 2 is an enlarged partial sectional elevation showing the means for connecting the leads to the rings; and Fig. 3 is a transverse section through the shaft and ring approximately along the line 3—3 of Fig. 2.

In the figures of the drawing, 10 represents the shaft of the machine on which the rotary field magnet 11 is mounted. At 12 is shown a collector ring or slip ring connected to one end of the field winding (not shown), by a collector lead 13. The other end of the winding will of course be connected to another collector ring which in this case will be located at the opposite end of the machine. This particular type of machine is generally inclosed within a ventilating housing, the walls of which fit around the shaft intermediate the field magnet and rings so that access can be had to the brushes. In this case the portion of the collector lead between the field magnet and collector ring is located in a slot 14 in the shaft, this portion of the shaft being surrounded by a sleeve 15 which holds the lead in place.

Referring now to Figs. 2 and 3, it will be seen that the ring is seated on an inclined or cone-shaped portion 16 of the shaft, being separated therefrom by insulation 17. The ring is held in position and clamped tightly on the shaft by a nut 18, a fiber or other insulating ring or washer 19 being interposed between the ring and nut.

The collector ring is provided on its inner surface with a wedge-shaped slot 20 to receive the end of the collector lead. The slot in this case extends across the bearing surface and is deeper at the end remote from the rotary field member, than at the end adjacent thereto. The slot is preferably cut in the ring with the bottom parallel with the axis of the ring. Secured to the end of the lead by rivets 21 is a wedge-shaped block 22 forming a terminal for the lead, the lead extending along one face of the block. The block 22 may be of any material, preferably, of metal. The terminal thus formed is located in the wedge-shaped slot, with the lead in engagement with the ring, the size and angle between the sides of the block being such that the terminal fills the slot in the ring. When the nut 18 is tightened, the end of the lead is held firmly against the ring. Centrifugal force also assists in pressing the lead against the ring.

It will be seen that the connection is efficient both electrically and mechanically, it being impossible for the lead to be pulled out of place or for the connection to be broken by centrifugal force. The ring is not weakened materially by the wedge-shaped slot and has ample wearing depth. The construction is such that the rings can be removed without first disconnecting, bending, or injuring in any manner the leads. Furthermore, the construction is very simple and inexpensive.

I do not desire to be confined to the exact details shown, but aim in my claims to cover all such which do not involve a departure from the spirit and scope of my invention.

What I claim as new and desire to secure by Letters Patent is:

1. In a dynamo-electric machine, a collector ring, an inclined or cone-shaped seat for said ring, and a collector lead having a wedge-shaped terminal held between the ring and its seat.

2. In a dynamo-electric machine, a shaft having an inclined or cone-shaped portion, a collector ring mounted on said inclined or cone-shaped portion of the shaft, and a collector lead having a wedge-shaped terminal held between the ring and shaft.

3. In a dynamo-electric machine, a collector ring, having an inclined or cone-shaped inner portion, an inclined or cone-shaped seat for said ring, said ring being provided with an inner wedge-shaped slot or opening, and a collector lead having a wedge-shaped terminal located in the slot and held between the ring and seat.

4. In a dynamo-electric machine, a collector ring having an inclined or cone-shaped inner portion, an inclined or cone-shaped seat therefor, one of said parts having a wedge-shaped slot or opening, and a collector lead having secured to one end a wedge-shaped member forming a terminal, said terminal being located in said slot.

5. In a dynamo-electric machine, a collector ring, a support therefor, one of said members having a wedge-shaped opening or slot, and a collector lead having secured at one end a wedge-shaped member forming a terminal, said terminal being located in said opening or slot and clamped between the support and ring.

6. In a dynamo-electric machine, a shaft having an inclined or cone-shaped portion, a collector ring seated on said cone-shaped portion of the shaft, said ring having a wedge-shaped slot, a collector lead having at one end a wedge-shaped member forming a terminal, said terminal being located in said slot, and a nut for clamping the ring on the shaft and for clamping the terminal between the ring and shaft.

In testimony whereof I affix my signature, in the presence of two witnesses.

EMIL MATTMAN.

Witnesses:
ARTHUR F. KWIS,
FRED J. KINSEY.